United States Patent [19]

Holtz

[11] Patent Number: 4,950,003
[45] Date of Patent: Aug. 21, 1990

[54] LUGGAGE CART

[76] Inventor: Gilbert J. Holtz, 182 Tibbetts Rd., Yonkers, N.Y. 10705

[21] Appl. No.: 373,563

[22] Filed: Jun. 30, 1989

[51] Int. Cl.$^5$ ............................................... B62B 1/12
[52] U.S. Cl. ............................... 280/655; 280/47.315; 403/362
[58] Field of Search ................. 280/638, 35, 639, 655, 280/655.1, 47.18, 47.315, 47.371; 403/362, 377, 378, 379

[56] References Cited

U.S. PATENT DOCUMENTS 2,578,409  12/1951  Evans et al. ..................... 280/655

FOREIGN PATENT DOCUMENTS 1509040  1/1968  France ............................ 280/655

Primary Examiner—Charles A. Marmor
Assistant Examiner—Richard Camby

[57] ABSTRACT

Improvements for slidably mounting a size-adjustable luggage cart handle inverter U-shape in a lower U-shape, consisting of each leg of the upper U-shape being disposed through a hole in a cap covering the opening of the lower U-shape and having an integrally molded hub with a threaded bore to thereby increase the number of teeth threadably engaging the threaded member which bears against the upper U-shape in any selected position of its sliding movement, which determines the size of the handle, and thus obviate thread-stripping, wobble and other such defects.

1 Claim, 1 Drawing Sheet

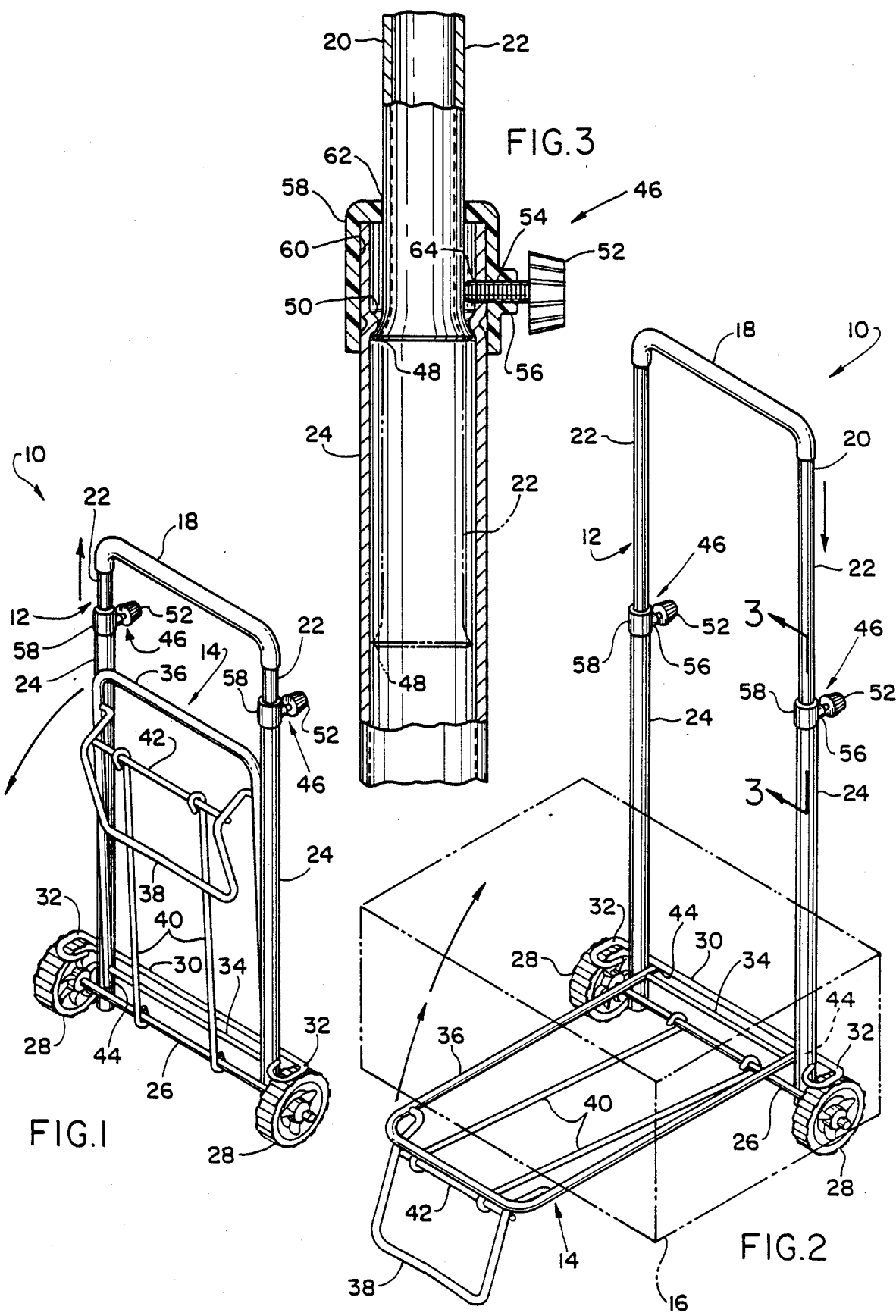

LUGGAGE CART

The present invention relates to improvements for luggage carts of the type used by travelers in airports or the like, and more particularly, to a size-adjustable handle in which the threads do not strip or other malfunctions occur in the threadably engaged components which provide the selected handle size that is used during use of the cart.

EXAMPLES OF THE PRIOR ART

In U.S. Pat. No. 4,261,447 issued to Arias et al., on Apr. 14, 1981, the position of movement of an upper handle member relative to a lower handle member of a luggage art which, of course, establishes the overall size of the handle, is prevented from inadvertently changing by projecting a holding pin through one of spaced openings in the legs of the upper handle member. The available handle sizes, however, are limited to the number of pin-receiving openings that are provided.

The available handle sizes are readily increased by having an inner end of a threadable member bear against the surface, rather than project into, the movable handle member, but the firmness of the bearing contact often fails to prevent inadvertent changes in the handle size during pushing or pulling of the cart with a heavy load thereon.

The patent issued to Evans, et al., Pat. No. 2,578,409 on Mar. 30, 1950 is noted, even though related to a golf cart rather than a luggage cart, for illustrating in FIG. 10 use of a nut 19 with a hub having a threaded throughbore 20 for a handle size-adjusting screw 21. The additional threads of the Evans, et al. threaded hub throughbore contributes to the firmness at which bearing contact can be made against the sliding handle member, but the welding attachment of nut 19 to the lower handle member is an undersirable manufacturing requirement.

In contract to the aforesaid, it is an object of the present invention to provide an optimum number of interengaging teeth in threadably engaged handle size-establishing components, but without complicating the construction of the luggage cart. It is an additional object to also assist in achieving smooth telescoping movement of the movable upper handle member relative to the stationary lower handle member.

In accordance with the present invention, the upper openings of the U-shaped lower handle member are capped, and in each cap a traverse integrally molded hub has a threaded throughbore to advantageously increase the available teeth for engagement with the locking screw to thereby obviate thread stripping and due to any other causes, any inadvertent disengagement of the established bearing contact that is made against the movable upper handle member. The cap opening in alignment with the upper opening of the lower handle member into which the upper handle member is slidably disposed, is sized to allow sliding movement of the upper handle member but at an optimum minimum sliding clearance, so that wobble is significantly reduced. The construction material of the cap is also preferably hard rubber or plastic, to assure smoothness in the movement that occurs through the opening of the cap.

The description of the invention which follows, together with the accompanying drawings should not be construed as limiting the invention to the example shown and described because those skilled in the art to which this invention appertains will be able to devise other forms thereof within the ambit of the appended claims.

FIG. 1 is a perspective view of a luggage cart in its folded condition ready for transport or storage in which the handle thereof is fully retracted into an optimum minimum size;

FIG. 2 is a similar view, but illustrating the cart in its unfolded condition ready for use in which the handle in only partially retracted to thereby correspondingly increase the size of the handle; and FIG. 3 is a sectional view of the handle locking mechanism which establishes the handle size, as taken along line 3—3 of FIG. 2.

As perhaps best shown in FIG. 2, the luggage cart 10 of the present invention is of the generally known type comprised of an upright handle frame 12 and a foldable platform section 14 upon which luggage or packages 16 can be transported.

Handle frame 12 includes a horizontal handle 18 consisting of a rubber or plastic covering formed about a hollow metal tubing 20 which has two dependent legs 22 that are sized to telescope easily within a cooperating pair of lower two vertical members 24 of frame 12. At the lower end of tubing members 24 a rodlike cross member 26 is fastened to form an axle for the wheels 28 which are connected thereon in a conventional manner. An additional cross member 30, welded to vertical members 24, has its outboard end shaped in a loop form over wheels 28. This loop form is intended to support any "soft" luggage on platform 14 that might otherwise rub on wheels 28.

In a preferred embodiment, another cross member 34, anchored at the lower ends of members 24, is used as a pivot for the main "U" shaped member 36 of platform 14.

As best shown in FIGS. 1 and 2, a support leg 38 is pivotably mounted in member 36 and is braced by a pair of link members 40. Leg member 38 has a horizontal cross piece joined near its upper end. The ends of links 40 are pivotable about axle 26 and cross piece 42. Links 40, axle 26 and cross piece 42 are located and dimensioned as to cause leg 38 to be extended from "U" member 36 when cart 10 is in its FIG. 2 unfolded condition, and retracted in the cart FIG. 1 folded condition. It is also to be noted that cross member 30 serves as a stop for the inboard ends 44 of "U" member 36 as it rotates about rod 34 in the unfolded cart condition. What has been described thus far are conventional structural features of luggage carts. What will not be described are noteworthy improvements according to the present invention.

Intermediate each cooperating pair of an upper handle leg or member 22 and a lower frame member 24 is a lock knob assembly 52 shown in cross section in FIG. 3. The lower end of leg 22 is flared at 48 to an outside diameter almost equal to the inside diameter of the hollow lower frame member 24. Thus, when handle 18 is in its fully extended or upwardly withdrawn position of movement, the flare 48 functions as a stop against an annular crimp 50 that is embodied in the upper end of member 24, thus preventing total disconnecting withdrawal of handle member 20,22 from handle member 24.

When the user wants to lock the handle 18 at a size anywhere between fully retracted or collapsed (FIG. 1) and fully withdrawn or extended (FIG. 2), he/she can do so by turning knob 52 which causes threaded shank 54 to lock against leg 22. Shank 54 is fitted to threadably engage a corresponding threaded throughbore of a hub 56 that is a molded structural feature of a cylindrical wall of a cylindrical cap member 58 preferably made of hard rubber or plastic. Frame member 24 has a traverse opening 64 in alignment with the traversely oriented threaded bore of hub 56. Optionally, opening 64 may be sized to be large enough to clear shank 54 or alternately it may be slightly undersized as to be tapped as a continuation of the internal thread of hub 56. Cap 58 is positioned as a closure on frame member 24 and, to this end, the cap has an inside diameter 60 that is press fitted on the upper end of a frame member 24 and is provided with a throughbore 62 in its upper surface that aligns with the upper opening of each hollow frame member leg 24. Throughbore 62 is sized to allow sliding clearance for each cooperating leg 22 and tubular member 24 receiving same.

When both knobs 52, in both lock assemblies 46, are turned counterclockwise, and thus to the "loose" condition, upper handle 18 can easily be raised or lowered to any desirable position. Knobs 52 can then be turned clockwise to the "lock" condition, to thereby establish the overall size of the handle 18 which of course, is a function of the extent that handle member 22 extends beyond the upper openings of lower handle member 24.

In FIG. 3, the solid line drawing of leg 22 shows the leg in the fully extended position and the phantom outline thereof is illustrative of any intermediate position. The conventional or prior art threaded interengagement of shank 54 in the threaded opening 64 of the frame tubes 24 has, in accordance with the present invention, been supplemented by additional teeth in threaded interengagement that is provided by each threaded bore of each hub 56 of each lock assembly 46, so that in the locking position the increased number of teeth obviate inadvertent movement from the selected position of movement of the extensible handle 18 during use of the luggage cart 10.

While the particular improved luggage cart herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for a luggage cart of the type having a size-adjustable handle comprised of a telescoped together cooperating pair of a first lower hollow tubular handle member with an upper opening therein in which is slidably disposed a second upper tubular handle member wherein the extent of the extension of said second handle member beyond said first handle member upper opening establishes the size of said handle of said luggage cart, said second upper tubular member having first and second flared ends, said first lower hollow tubular handle member having a first and second ends having a crimped portions therein, said crimps retaining said flared ends of said second tubular member within said first lower hollow tubular member, a hollow cap disposed in covering relation over said first handle member upper opening having a central opening in aligned relation to said upper opening and a cylindrical wall in encircling relation about the upper end of said first handle member and extending in covering relation over said crimps therein, said central opening of said cap being slightly undersized with respect to the upper opening of said first lower handle member, to thereby provide an optimum sliding clearance for the size-adjusting sliding movement of said second upper handle member, a laterally extending hub embodied in said cap wall oriented transverse to the sliding direction of said second handle member, said hub having a threaded opening therethrough opening at its inner end into said hollow interior of said first handle member so as to provide access to said second handle member slidably disposed therein, and a threaded member adjustably threadably disposed in said hub threaded opening for engaging said second handle member incident to holding said second handle member in a selected sliding position of movement, whereby said size of said laterally extending hub is selected to provide a correspondingly sized said threaded opening in said hub to provide an optimum number of threadably interengaged teeth of said threaded hub opening and said threaded member to obviate inadvertent disengagement of said threaded member from said second handle member during use of said luggage cart.

* * * * *